United States Patent [19]

Below

[11] Patent Number: 5,107,960
[45] Date of Patent: Apr. 28, 1992

[54] CRANKCASE OIL-BARRIER SYSTEM

[75] Inventor: John F. Below, Oakland, Calif.

[73] Assignee: Rix Industries, Inc., Oakland, Calif.

[21] Appl. No.: 546,002

[22] Filed: Jun. 28, 1990

[51] Int. Cl.⁵ ............................................ F01M 13/00
[52] U.S. Cl. ...................... 184/6.16; 184/25; 417/534
[58] Field of Search ............ 184/6.16, 6.17, 6.8, 184/18, 19, 20, 24, 25; 92/12.2, 71; 123/41.86, 74 AE; 417/534

[56] References Cited

U.S. PATENT DOCUMENTS

| | | | |
|---|---|---|---|
| 1,415,858 | 5/1922 | Barrett | 184/24 |
| 1,743,558 | 1/1930 | McCabe | 123/74 AE |
| 1,791,362 | 2/1931 | Lewis | 417/534 |
| 2,878,990 | 3/1959 | Zürcher | 184/24 |
| 3,165,172 | 1/1965 | Baker | 184/24 |
| 3,272,132 | 9/1966 | Stoelting et al. | 417/534 |
| 3,332,323 | 7/1967 | Roeske | 92/12.2 |
| 4,005,763 | 2/1977 | Wallis | 184/24 |
| 4,498,372 | 2/1985 | Pareja | 417/534 |
| 4,674,957 | 6/1987 | Ohta | 92/12.2 |
| 4,756,674 | 7/1988 | Miller | 417/534 |

FOREIGN PATENT DOCUMENTS 0721473  3/1932  France ........................... 123/74 AE

*Primary Examiner*—Ira S. Lazarus
*Assistant Examiner*—Alan B. Cariaso
*Attorney, Agent, or Firm*—Glen R. Grunewald

[57] ABSTRACT

A compressor shielded from crankcase oil by a wall having a hole surrounded by a wiper through which a piston rod assembly passes and having the chamber between the crankcase and the underside of the piston provided with a pressure relief valve and an atmosphere vent having a check valve whereby the chamber is never at sub-atmospheric pressure and there is never gas flow through the wiper toward the piston.

2 Claims, 2 Drawing Sheets

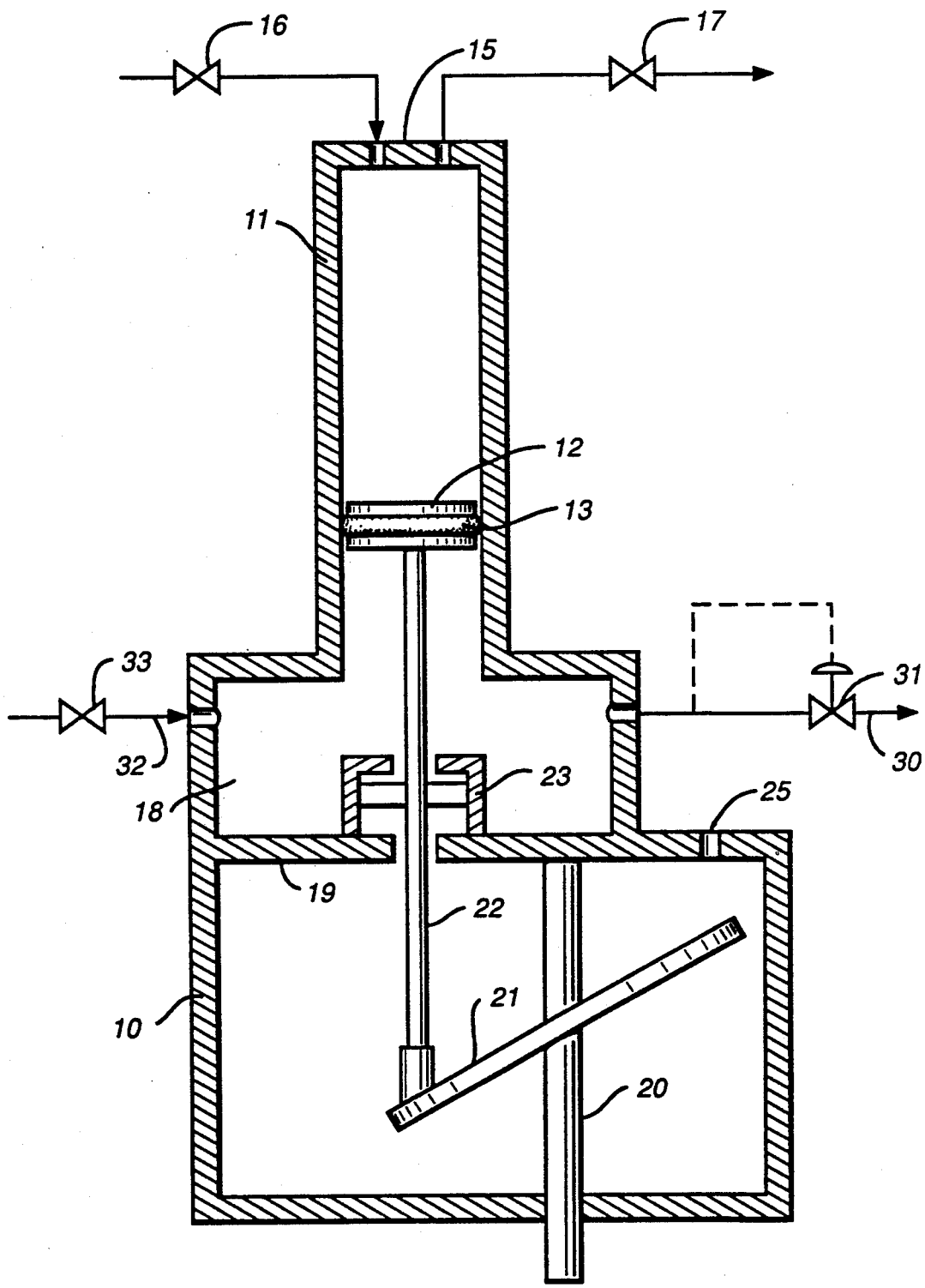
FIG._1

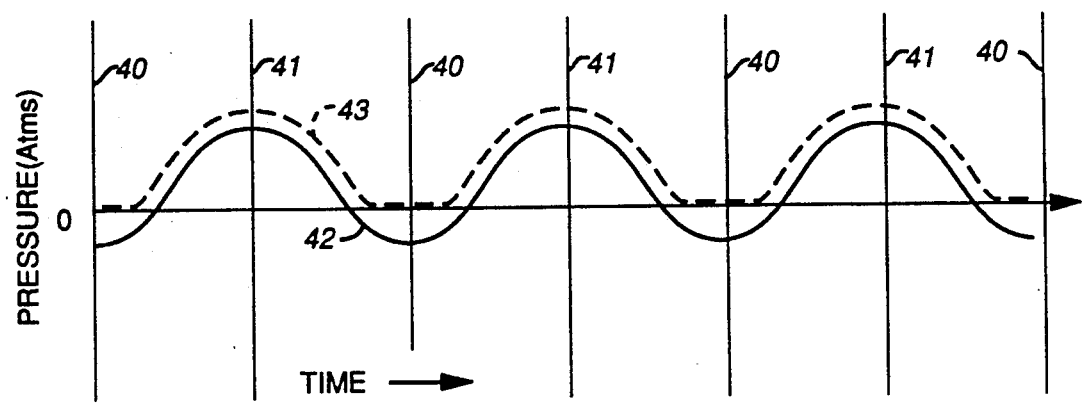
FIG._2
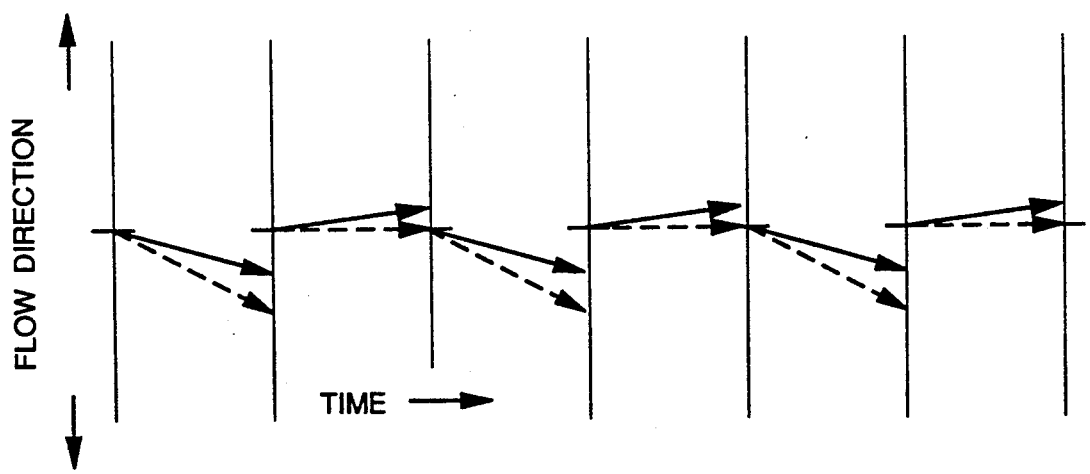
FIG._3

CRANKCASE OIL-BARRIER SYSTEM

TECHNICAL FIELD

This invention is in the field of compressors used to compress gases that must be free of oil.

BACKGROUND ART

Compressors that operate with pistons and cylinders use piston rods between a crankshaft or its equivalent and the piston in order to move the piston axially in reciprocating motion within the cylinder. One equivalent to a crankshaft is a swash plate which also converts the rotary motion of a power source to reciprocating motion of a piston within a cylinder. The crankshaft or swash plate is located in a crankcase and it is usually provided with a liquid oil lubrication system to lubricate the bearings between the crankshaft or the swash plate and the piston rods as well as other parts that move in a manner to create friction. In some compressors the lubricant is pumped to the points where lubrication is needed, and in other compressors lubrication splashes within the crankcase due to the movement of the crankshaft or swash plate. In either case the lubricant is subjected to high energy and it is subdivided into tiny droplets which eventually plate out on the interior surfaces of the crankcase and rejoin the main body of lubricant. Lubricant finds its way into the cylinders of the compressors and small amounts of it saturate the piston rings and eventually finds its way into the compressed gas stream.

Some compressed gases cannot tolerate oil contamination. For example, air that is compressed for breathing such as is used in SCUBA tanks or air that circulates in a confined space such as in a submarine can tolerate no oil contamination. Gases used for medical purposes or gases that react with oil must also be free of oil.

To keep crankcase oil from the cylinder of a compressor and, therefore, from the stream of compressed gas, it has been attempted to isolate the piston and cylinder in a chamber separated from the crankcase by a wall and to pass the piston rod or piston rod assembly through wipers surrounding the hole in the wall. A very successful means for accomplishing this objective is to position the piston rod within a sleeve that is sealed against the bottom of the piston so that the sleeve reciprocates axially through the wiper even though the piston rod sweeps out a shape such as a fan or a cone. This device is the subject of my co-pending patent application entitled OIL-SHIELDED COOMPRESSOR, Ser. No. 545,036, filed Jun. 25, 1990.

A chamber so isolated from the crankcase is subjected to pulsing pressures due to the action of the piston. When the piston moves through its compression stroke it increases the volume of the chamber and thereby reduces the pressure in the chamber, while when the piston is in its intake stroke it will reduce the volume of the chamber and thereby increase pressure in the chamber. There is always a small flow of gas into the chamber due to blow-by past the piston ring and in compressor stages operating at very high pressure this blow-by may be more significant than in low pressure stages. The condition of the piston rings will also cause the amount of blow-by to vary. In order to avoid an unacceptable build-up of pressure the chamber is vented.

Although the chamber beneath the piston has an average super-atmospheric pressure, the pressure pulsations produce some periods of sub-atmospheric pressure in the chamber; and during those sub-atmospheric periods, oil tends to be blown through the wipers from the crankcase into the chamber. As the wiper elements become contaminated oil is drawn into the chamber, and it eventually finds its way into the compressed gas stream by being carried up the walls of the cylinder by piston rings that become contaminated with oil.

SUMMARY OF THE INVENTION

This invention is a compressor having a wall separating the crankcase from the chamber in which the piston and cylinder function—the wall having a wiper through which a piston rod or piston rod assembly operates. The device of this invention includes an outlet from the chamber to the atmosphere that includes a one-way pressure relief valve and an inlet from the atmosphere to the chamber that includes a one-way valve. The outlet valve maintains a super-atmospheric pressure within the chamber, preferably at least 3 psi. The device of this invention not only provides a positive, super-atmospheric pressure within the chamber containing the piston and cylinder assembly, but it prevents a sub-atmospheric pressure from existing in the chamber regardless of the magnitude or direction of pressure pulsations caused by the movement of the piston in the cylinder.

BRIEF DESCRIPTION OF THE DRAWINGS

FIG. 1 is a schematic cross section elevation view of a device embodying this invention.

FIG. 2 is a plot of pressure vs. time for compressors embodying this invention and for compressors of the prior art.

FIG. 3 is a plot of gas-flow direction vs. time for compressors embodying this invention and for compressors of the prior art.

BEST MODE FOR CARRYING OUT THE INVENTION

FIG. 1 illustrates schematically a compressor embodying this invention. The compressor includes a crankcase 10, a cylinder 11 and a piston 12. The piston 12 seals against the wall of cylinder 11 with a piston ring 13. The compressor includes a cylinder head 15, a gas inlet provided with check valve 16 and a gas outlet provided with check valve 17. A chamber 18 is formed beneath piston 12 by wall 19 which separates the crankcase 10 from the portion of the compressor beneath piston 12.

The piston is driven from an external power source which rotates shaft 20 which activates swash plate 21. Swash plate compressors are known to the art and they function by producing a wobbling action in the swash plate 21 which causes piston rod 22 to move in a reciprocating motion which in turn causes piston 12 to reciprocate within cylinder 11. The device illustrated schematically in FIG. 1 will be provided with conventional elements such as bearings, seals and the like which are known to the art and form no part of this invention.

Piston rod 22 extends through a hole in wall 19 which is surrounded with wiper box 23. The piston rod 22 may be in the form of a piston rod assembly which includes a sleeve surrounding piston rod 22 and having a large enough internal diameter to completely contain any fan-shaped or cone-shaped region swept out by the operation of piston rod 22. Wiper box 23 contains wipers that remove oil from the piston rod assembly that reciprocates axially through wiper box 23. Crankcase 10 is also provided with vent 25.

Although the primary purpose of the compressor illustrated in FIG. 1 is to draw ga through valves 16 into the upper portion of cylinder 11 while piston 12 is moving downwardly and to compress that gas and drive it through valve 17 when piston 12 is moving upwardly, piston 12 inevitably produces a double-acting effect by increasing and decreasing the volume of chamber 18 by its reciprocal action. Thus, on the intake stroke of piston 12 when it is moving downwardly it tends to compress whatever gas is in chamber 18 to produce a high-pressure surge in chamber 18, and when piston 12 moves upwardly in its compression stroke the volume of chamber 18 is increased and produces a low-pressure surge in chamber 18. In compressors of the prior art having their crankcases separated from their piston-cylinders with a wall and the piston rod assembly surrounded by a wiper box, these pressure surges range between super-atmospheric pressures on the down stroke of the piston and sub-atmospheric pressures on the up stroke of the piston. Even though the average pressure in the chamber equivalent to chamber 18 of this invention in prior art compressors is super-atmospheric, during the sub-atmospheric pressure periods there is a flow of gas through the wiper box 23 from the crankcase toward chamber 18.

In accordance with this invention the chamber 18 is vented through line 32 which includes one-way valve 33 that permits air to flow into chamber 18. Chamber 18 is also provided with a line 30 containing pressure-control valve 31 which is a pressure-release valve that opens only at a preselected pressure in chamber 18. In a preferred embodiment of the invention pressure-relief valve 31 opens to vent the chamber 18 when the pressure in chamber 18 is about 3 psi.

FIG. 2 is a plot of pressure vs. time illustrating the conditions found in chamber 18. The time is measured in piston strokes, vertical lines 40 indicating the start of the intake stroke, i.e. when piston 12 begins moving downwardly, and lines 41 indicating the start of the compression stroke, i.e. when piston 12 begins moving upwardly. It is evident that when piston 12 moves downwardly it creates a suction within cylinder 11 but it compresses gas within chamber 18, while when piston 12 moves upwardly it creates high pressure in cylinder 11 but it creates a relatively low pressure in chamber 18. The solid line 42 represents the pressure in chamber 18 when it is constructed in accordance with the prior art, specifically, when piston 12 begins its downward stroke the pressure in chamber 18 rises to a super-atmospheric pressure but when piston 12 begins its upward stroke the pressure in chamber 18 diminishes to a sub-atmospheric pressure. The pressure vs. time curve resembles a sine wave with the major portion of the wave above atmospheric pressure but a small portion of the wave below atmospheric pressure.

In accordance with this invention the pressure in chamber 18 cannot become sub-atmospheric because valve 33 opens to vent chamber 18 at atmospheric pressure, but valve 31 restrains the exit of gases from chamber 18 to provide a super-atmospheric pressure that is higher than the super-atmospheric pressure that would exist in a vented chamber. The broken line in FIG. 2 represents the time vs. pressure curve that exists in chamber 18 in accordance with this invention. It is evident that the pressure in chamber 18 in a compressor made in accordance with this invention is always higher than the pressure in chamber 18 of a prior art device. Operation of the device of this invention tends to drive gas from chamber 18 toward crankcase 10, and, more importantly, the pressure in chamber 18 can never be sub-atmospheric because valve 33 opens to permit air to flow into chamber 18 when the diminishing pressure in chamber 18 resulting from an upward stroke of piston 12 reaches atmospheric pressure. FIG. 3 illustrates the direction of flow of gas between chamber 18 and crankcase 10 during the same time cycles shown in FIG. 2. Here again, the solid line represents the prior art and the broken line shows a device constructed in accordance with this invention. On the downward travel stroke of piston 12 the pressure in chamber 18 in devices built in accordance with the prior art is super-atmospheric, and the tendency is for gas to flow from chamber 18 toward crankcase 10. The same situation exists in accordance with this invention but to a greater degree because the pressure in chamber 18 is higher than in prior art devices in that valve 31 maintains a super-atmospheric pressure within chamber 18. On the upward stroke of piston 12, in devices built in accordance with prior art there is a sub-atmospheric pressure in chamber 18 which causes the direction of flow of gas to be from the crankcase toward chamber 18 as illustrated in the three complete cycles shown in FIG. 3.

In a device built in accordance with the present invention there is either no gas flow between chamber 18 and crankcase 10 or there is gas flow from chamber 18 toward crankcase 10 because there is never a sub-atmospheric pressure in chamber 18. The fact that chamber 18 never has a sub-atmospheric pressure creates a sweeping action that prevents oil from passing through the wiper 23 toward chamber 18 and in fact blows oil from wiper 23 toward crankcase 10.

I claim:

1. In a compressor having a cylinder, a piston, a vented crankcase, a housing for said piston and cylinder separated from said crankcase with a wall including a hole for a piston rod assembly and a wiper surrounding said hole to wipe oil from said piston rod assembly, the improvement comprising:
    an inlet into said housing to pass air at atmospheric pressure into said housing, said inlet including a one-way valve, and
    an outlet from said housing to vent gas from said housing to the atmosphere, said outlet including a one-way valve operable at super-atmospheric pressure.

2. The device of claim 1 wherein said outlet one-way valve is openable at a pressure of at least 3 psi.

* * * * *